May 11, 1954 W. E. BRADLEY ET AL 2,678,386

FREQUENCY MODULATION RECEIVER

Filed Feb. 5, 1949

INVENTORS
WILLIAM E. BRADLEY
JOSEPH C. TELLIER
BY Brown, Denk & Synnestvedt
AGENTS Patented May 11, 1954 2,678,386

UNITED STATES PATENT OFFICE 2,678,386

FREQUENCY MODULATION RECEIVER

William E. Bradley, Springfield Township, Montgomery County, and Joseph C. Tellier, Penn Wynne, Pa., assignors to Philco Corporation, Philadelphia, Pa., a corporation of Pennsylvania Application February 5, 1949, Serial No. 74,732

2 Claims. (Cl. 250—27)

The present invention relates broadly to circuit arrangements adapted for use in frequency control circuits, frequency modulation detectors, and the like, and more particularly to the elimination of certain undesirable effects caused by the influence of noise on the performance of such apparatus.

It is a general characteristic of certain apparatus of the type referred to above that it is, to a considerable degree, insensitive to changes in the amplitude of the signal being received. Noise which appears in the form of amplitude modulation of the applied signal may be removed by the action of a conventional limiter or else excluded by the action of some device such as a locked-in oscillator, which, as is well known, may be arranged so as to ignore all but the most violent changes in the amplitude of the applied signal.

Since intelligence, on the other hand, is transmitted by varying the frequency of the signal, the receiver should be very sensitive to changes in the frequency of the desired signal, i. e. to frequency modulation. It will be understood, that reference is had here not to the change in the absolute frequency of the signal but to the deviation of this frequency from a given center frequency. It is common practice to consider such a deviation either from the point of view of a frequency deviation or from the point of view of a phase deviation which latter always accompanies, and is related to, the former. This relationship is such that, for every cycle per second by which the frequency of a given signal differs from that of a reference signal, the phase of the given signal changes at the rate of 360° or $2\pi$ radians per second with respect to the phase of the reference signal. Consequently, any variation in the rate of change of phase of the given signal with be linearly related to a deviation in the frequency of the given signal, and vice versa. The choice of point of view is determined largely by the type of phenomenon which is to be illustrated and, in the subsequent discussion, one or the other is adopted on various occasions to provide the proper emphasis.

It is clear that, since the receiver is highly sensitive to changes in the frequency of the desired signal, any noise which appears in the form of a change in frequency (or phase) will be sensed by the receiver and will give rise to a corresponding noise output.

The reception of frequency modulated carrier waves has long been marred by the occurrence of relatively low-pitched, sharp and shot-like noises, which can perhaps best be described as "pops" and which previous investigators had been completely unable to eliminate. In fact, the very cause of such "pops" was heretofore obscure and they were, erroneously, attributed to defects in the design and construction of various components of the frequency modulation receiver.

Our investigations in connection with the present invention have shown both the true cause of such "pops" and means for overcoming their deleterious effects on the reception of desired signals.

Basically, this is accomplished by the novel cooperation between a low-pass filter and a particular type of frequency modulation detector or frequency control device, namely one which falls in the broad class of synchronized oscillator detectors and frequency control devices and which may be, more specifically, of the type disclosed and described in full in the copending application of William E. Bradley, Serial Number 576,057, filed February 3, 1945 (now Patent No. 2,494,795) and assigned to the assignee of the present invention. In general, it may then be said that the principal purpose in applying the principles of the present invention to synchronized oscillators lies in preventing their breaking out of the desired locked-in condition under the influence of certain types of noise signals, the characteristics of which are discussed in more detail hereinafter.

In accordance with the foregoing discussion, it is an object of the present invention to provide an improved circuit arrangement for controlling the frequency of an oscillator by the application thereto of a control voltage or signal.

It is another object of the present invention to provide an improved synchronized-oscillator circuit in which the effect of noise on the synchronizing signal is materially diminished.

It is another object of the present invention to provide an improved frequency modulation detector in which certain undesirable noise output voltages—heretofore resulting from the presence of certain types of radio frequency disturbances, and giving rise to audible "pops"—are substantially eliminated.

These and other objects of the present invention will become more apparent from the following discussion taken in conjunction with the accompanying drawings in which.

Figure 1:
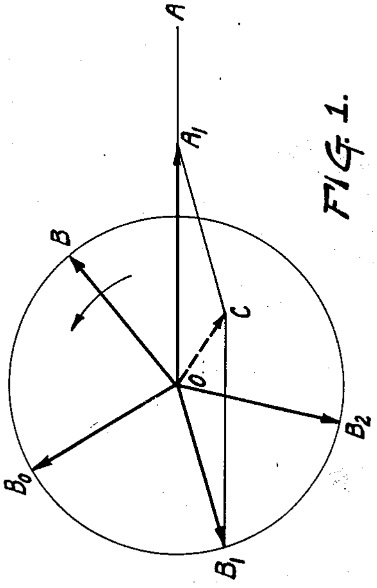
Figure 1 is a diagram which will be referred to in the explanation of the basic phenomenon involved in the concept of the present invention.

With particular reference now to Figure 1, there is shown a vector diagram illustrating the effect of an impulse noise on various signals when the amplitude of that noise exceeds that of the signals during some part of the duration of the noise.

It is known that most impulse noise consists of relatively high amplitude bursts of very short duration, generally less than one microsecond. Such bursts have been shown to shock excite the intermediate frequency system which then oscillates, or "rings," at its own center frequency for a length of time dependent on the I. F. bandwidth but considerably longer than the duration of the noise burst. As will become apparent from the subsequent discussion this ringing is capable of causing "pops" only if its amplitude exceeds that of the desired signal at some time during its occurrence. It will, therefore, be useful to define a "capture time" as that portion of the total ringing time during which ringing due to the noise burst exceeds the desired signal in amplitude. It has been found that this capture time varies only slightly with noise amplitude and number of I. F. stages, particularly when the maximum amplitude of the noise is considerably in excess of the signal amplitude, and for a typical present-day commercial receiver may be taken to be approximately seven microseconds. For seven microseconds, therefor, ringing due to the noise burst is the predominant signal in the I. F. channel. This capture time, as well as the total ringing time, is so short compared with the duration of one cycle of even the highest audio frequency that, during this time the received carrier frequency may be assumed essentially constant at some fixed deviation from center frequency.

In Figure 1 the vector diagram is stopped at center frequency and the direction of line segment OA is representative of that frequency. The received signal, as represented by vector OB, rotates about origin O at a rate equal to the fixed frequency deviation, which may, in present-day FM, be anywhere from zero to 75 kilocycles per second. For purposes of discussion, the frequency deviation is assumed to be equal to 50 kilocycles per second in this case and the signal frequency is assumed higher than center frequency. This means that vector OB rotates counterclockwise about origin O at the supersonic rate of 50,000 revolutions per second as indicated by a curved arrow in Figure 1. Upon arrival of an impulse noise signal of the type under discussion, ringing at center frequency occurs and the maximum amplitude of the ringing signal is represented by the magnitude of vector $OA_1$ which, naturally, lies along line OA. It is now assumed that this ringing starts at time $t_0$ when the signal vector OB is in a position indicated by vector $OB_0$ and continues till time $t_2$ when the signal vector OB has advanced to a position indicated by vector $OB_2$ and that the ringing reaches its maximum amplitude $OA_1$, which is larger than that of signal vector OB, at an intermediate time $t_1$. The total I. F. signal output will, of course, be the vector sum of the signal and the noise, both in phase and in amplitude. Thus at time $t_1$ the I. F. signal will have the magnitude and phase position of the vector sum of $OB_1$ and $OA_1$ and will be represented by broken line OC, as determined by the parallelogram formed on the lines connecting points $B_1$, O and $A_1$. Instead of having advanced by an angle corresponding to the difference in direction between $OB_0$ and $OB_1$ during this time interval, as would have been the case in the absence of the ringing, the I. F. output has retrogressed in phase by an angle corresponding to the difference in direction between $OB_0$ and OC. Since at time $t_2$ the entire I. F. signal is once more represented by vector $OB_2$ alone, analysis of Figure 1 shows that if the desired signal OB is sufficiently close to being in phase opposition with the center frequency line OA at time $t_0$, then the total signal will continue to retrogress in phase until the ringing has died down at time $t_2$. The signal thus loses a total of one revolution or $2\pi$ radians in phase from the phase position which it would occupy had the noise not occurred.

It may be shown that the capture time, or, in this particular case, the time interval during which the magnitude of the vector representing the ringing exceeds that of the vector representing the signal, is roughly inversely related to the shift in frequency deviation which takes place due to this capture. Thus a loss in phase difference of $2\pi$ radians with a capture time of, for example, seven microseconds, corresponds to a shift in frequency deviation of nearly 150 kilocycles. The frequency shift takes place instantaneously, for all practical purposes, and it is furthermore always in the direction of the center frequency. The new value of the frequency deviation is then maintained for as long as the ringing lasts whereupon it returns, practically instantaneously, to its former value. The constancy of the frequency shift is due to the fact that one complete cycle is always lost for a given capture time.

While the preceding analysis has been carried out for a case in which the signal frequency was higher than the center frequency, it will be understood that similar reasoning may be applied to the case when the signal frequency is lower than center frequency. In the latter case, however, one complete cycle would be gained each time an impulse noise signal was picked up.

Whether or not this loss (or gain, as the case may be) occurs depends, as has been pointed out hereinbefore, upon the phase of the desired signal relative to the reference center frequency during the period when the noise signal is being received. More specifically, the condition of loss or gain hereinbefore described will arise if the amplitude of the noise exceeds the amplitude of the desired signal at the time when the desired signal passes through phase opposition with the reference center frequency. Referring now once more to Figure 1, the loss of a whole cycle will occur if the magnitude of the noise vector along line OA exceeds the magnitude of the desired signal vector OB at the time when the latter is displaced by 180° in phase from line OA.

For a more detailed mathematical discussion of the theory of impulse noise in frequency modulation, particularly with respect to capture time and related concepts, reference is made to a paper published in the October 1946 issue of the "Proceedings of the I. R. E.," pp. 743–751, and entitled "The theory of impulse noise in ideal frequency-modulation receivers."

Considering now the effect of impulse noise of the type herein dealt with upon the performance of a frequency modulation detector as used in frequency modulation receivers, it should first be reemphasized, that, although the impulse noise in itself constitutes a change in the amplitude of the received signal, its effect on the apparatus associated with the detector is such that a corresponding change in frequency appears at the detector. Consequently, the detector, being sensitive to changes in frequency—or equivalent changes in phase—is sensitive to impulse noise.

When the impulse noise, and its attendant ringing of the I. F. circuits, occur in a phase relation which, as outlined above, permits loss (or gain) of an entire cycle, the equivalent sudden 150 kilocycle shift in frequency produces an audible signal which may be shown, both mathematically and experimentally, to contain low frequency components of sufficient amplitude to cause a sharp, low-pitched "pop" to appear in the output of the receiver.

The shift in frequency due to impulse noise is basically similar to that due to modulation in accordance with desired intelligence, but takes place much more rapidly than the latter. In fact, frequency shifts due to intelligence obviously take place at audio rates, while frequency shifts due to the type of noise under discussion take place at rates considerably in excess of that corresponding to the highest desirable audio frequency. Consequently, we have found that a basic approach to the elimination of "pops" from frequency modulation receivers is to make the frequency detector incapable of responding to very rapid changes in frequency. From this basis we have evolved the fundamental idea which governs the design and construction of apparatus in accordance with the present invention and which consists of supplying sufficient inertia to the detector to prevent it from following changes in signal frequency which occur at certain rates higher than the highest audio frequency.

Figure 2:
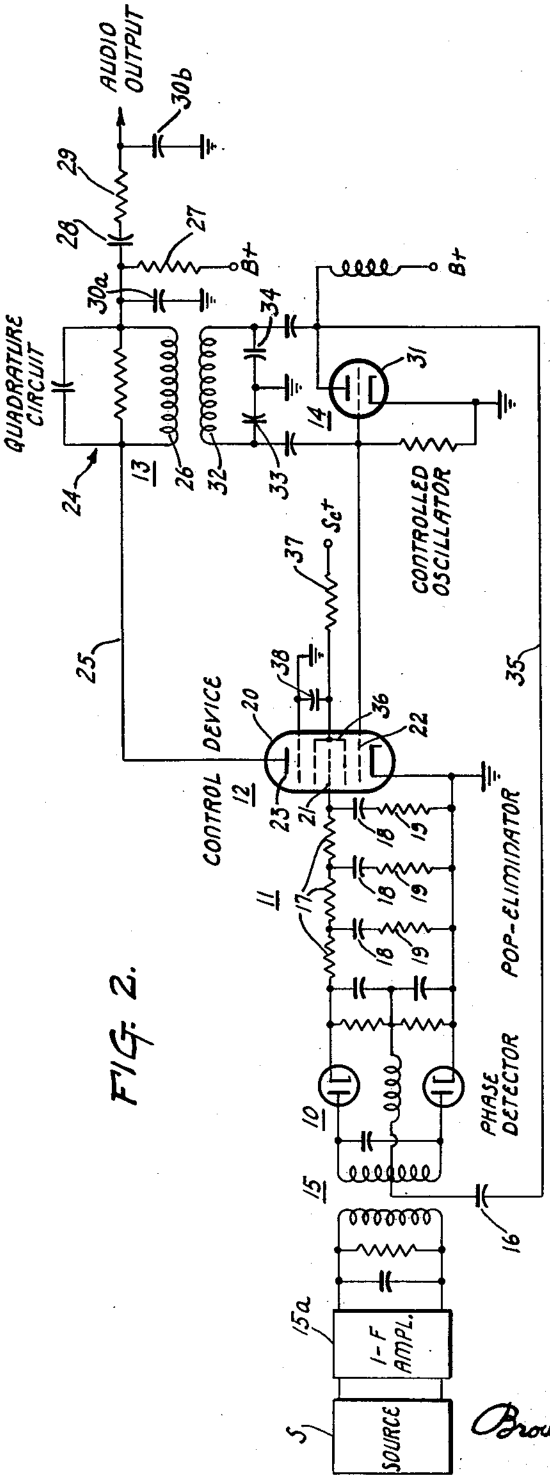
Figure 2 shows, diagrammatically, an embodiment of the present invention designed to reduce the occurrence of audible "pops" in FM receivers.

A system which performs in accordance with the principles of our invention as hereinbefore set forth, is illustrated in Figure 2, to which the immediately subsequent discussion is more specifically directed.

The circuit diagram shown is that of a frequency modulation detector, which comprises, in general terms, a phase detector 10, a pop-eliminator 11, a control device 12, a quadrature circuit 13 and a controlled oscillator 14.

The phase detector is of the conventional, balanced, double-diode type. The frequency-modulated intermediate frequency carrier is applied to the phase detector by way of the tuned primary of the I. F. transformer 15 which is here shown connected to the output of the I. F. amplifier 15*a*, this latter, in turn, deriving its signals from a source schematically represented by box S. Oscillations derived from the controlled oscillator 14 are applied to the phase detector by way of the coupling condenser 16 which is connected to the center tap of the I. F. transformer secondary. The operation of a phase detector of this type is so well-known as to require no further discussion in this connection.

Pop-eliminator 11 comprises essentially a low-pass filter made up of a number of series resistor each designated by reference numeral 17, and each by-passed to ground by means of a condenser 18. A resistor 19 is also shown in series with each of condensers 18. The features and characteristics peculiar to this network, as they pertain to the present invention, are hereinafter discussed in greater detail.

The control device 12 of the circuit of Figure 2 comprises a multi-grid control tube 20 having input grids 21 and 22, a radio frequency output circuit comprising the anode 23 and the resonant plate circuit 24, and an audio frequency output circuit comprising the anode 23, the conductor 25, the inductance coil 26 (which, of course, has no effect on the audio frequency circuit), the audio-frequency plate load resistor 27, coupling condenser 28, and the R. F. filter combination 29—30*a*—30*b*. The radio frequency oscillations generated by controlled oscillator 14 are supplied by suitable connection to input grid 22 of control device 12, whence they are fed back, by way of connection 25 and quadrature circuit 13, to the oscillator tank circuit in quadrature phase relation with the signals generated in the tank circuit, the magnitude of this fed back quadrature signal being controllable in response to variations in the signal voltage applied to input grid 21 of tube 20. The control tube 20 may be a type 6SA7 heptode, or it may be of the type which is described in greater detail in the above-mentioned copending application.

The controlled oscillator 14 comprises the triode 31 in combination with a tank circuit consisting of the inductance coil 32 and the condensers 33 and 34 connected serially thereacross. This oscillator is here shown as being of the well-known Colpitts type, and need, therefore, not be described in detail. It will be understood, in this connection, that the choice of a suitable controlled oscillator is largely arbitrary and only restricted by the necessity of its functioning in the manner hereinafter set forth. Thus, by making minor changes in the circuit arrangement of a nature well within the scope of anyone skilled in the art, other types of oscillators may be substituted, such as, for instance, one of the Hartley type; such substitutions are, therefore, considered within the scope of the present inventive concept.

The quadrature circuit comprises the resonant circuit 24 inductively coupled to the tank circuit 32—33—34 of the oscillator. The resonant circuit 24 is connected in the R. F. plate circuit of tube 20. The low potential end of the resonant circuit is returned to ground through the R. F. by-pass condenser 30*a*. The plate of oscillator tube 31 is connected to the secondary center tap of I. F. transformer 15 by means of conductor 35 and coupling condenser 16.

While not essential to a realization of all the features of the present invention, it is preferred that the oscillator signal and bias voltages supplied to grid 22 of tube 20 be of such magnitude that tube 20 operates under class C conditions. A class C mode of operation in which plate current flows in tube 20 during only about 60° out of every 360° of each cycle has been found useful in practice.

In the remainder of the discussion of Figure 2 the description is particularly directed to the preferred class C embodiment of the invention.

The operation of the entire device here illustrated is as follows.

The phase detector 10 provides an output component, the magnitude of which is proportional to the phase difference between the frequency modulated I. F. input and the signal derived from oscillator 14. The tank circuit tuning of the oscillator is so adjusted that, when an undeviated I. F. signal is applied to the phase detector via I. F. transformer 15, the operating frequency of the oscillator is identical with that of the undeviated I. F. input signal, with the oscillator voltage in phase quadrature relation with the input signal. This phase relation is maintained by means of the R. F. control voltage supplied to the oscillator by way of the conductor 25, the quadrature circuit 13 and the coupling between the quadrature circuit and the oscillator tank circuit.

When the frequency of the input signal shifts, the output voltage of phase detector 10 changes in accordance with the concomitant phase change, the amplitude of the R. F. component of output from the control device 12 changes, and this change is in such direction as to cause the frequency of oscillator 14 to follow that of the I. F. input signal. Of course, the initial phase quadrature relation will not be maintained as the frequency of the applied carrier varies, the departure from phase quadrature being a function of the deviation of the applied carrier wave. Because of this variation about the main quadrature relation, the phase detector 10 will supply a low frequency output voltage, the magnitude of which is proportional to the deviation of the applied carrier from its means frequency. This low frequency output is applied through pop-eliminator 11 to control grid 21 of control device 12, as shown in Figure 2, and may be utilized to control the amplitude of the R. F. component of the output of control device 12 (with the results hereinbefore outlined).

It is interesting to note that no low frequency control voltage is applied to the oscillator, nor is the conventional reactance tube provided. Moreover, when the R. F. control voltage is in a strictly quadrature (i. e. wattless) relation to the oscillator signal (as it inherently is in the preferred class C operation of the amplifier), variations in the amplitude of the quadrature signal cannot affect the amplitude of the oscillator signal. The frequency of the oscillator, on the other hand, varies linearly with the high frequency output component of control device 12. The frequency variations of the oscillator output thus reproduce the frequency modulation of the input signal and, if desired, known means may be provided for detecting this frequency modulation of the locally generated oscillations, such as, for example, a conventional frequency discriminator.

An important aspect of the invention resides in the fact that, while there is an R. F. path extending directly from controlled oscillator 14 to phase detector 10, there is no direct R. F. path in the opposite direction and consequently the I. F. input signal cannot affect the oscillator in any way except in the desired manner, i. e. by way of the output of the phase detector.

As for some of the practical considerations governing the preferred design and operation of the circuit components hereinbefore analyzed, a more detailed discussion of certain of their features is now presented. It will be understood that, since the control tube 20 is operated under class C conditions, relatively short, high amplitude pulses of plate current, at oscillator frequency, are supplied by tube 20 to the resonant plate circuit 24. Substantially only the fundamental component of this pulse signal appears across resonant circuit 24 and it is this component which is applied, by virtue of the inductive coupling between the windings 26 and 32, to the oscillator tank circuit 32—33—34. Although the fundamental component of voltage established across resonant circuit 24 due to plate current is, inherently, precisely in phase with the oscillator signal voltage applied to grid 22 of the control tube 20, the voltage applied to the tank circuit of the oscillator through the inductive coupling will be precisely in phase quadrature relation with the corresponding voltage generated in the tank circuit by the oscillator. Consequently, the voltage so applied to the oscillator tank circuit will have the same effect as the shunting thereacross of an equivalent pure reactance. Stated differently, this voltage is a quadrature frequency-control voltage, and as such may be employed to control the frequency of the oscillator. Whether the equivalent reactance is inductive or capacitive depends, of course, upon the relative direction, or phasing, of windings 26 and 32. We have found it expedient to so phase the windings that an increase in phase detector plate current will produce a decrease in oscillator frequency.

That the voltages across the primary and secondary windings of tuned transformers are in quadrature relation is too well known to require comment.

It need only be said that, since, in the present invention, this phase quadrature relation is preferably maintained substantially constant throughout the band of frequencies covered, the resonant circuit 24 is preferably heavily damped, and the coupling between the two circuits is somewhat less than critical coupling.

Although the resonant circuit 24 and the tuned secondary winding of I. F. transformer 15 are tuned about the frequency of the undeviated carrier signal as a center, the tank circuit 32—33—34 of the controlled oscillator is tuned somewhat outside the deviation band of the signal to be received. This is because the quadrature control signal derived by way of the resonant circuit 13 always exerts a tuning influence on the oscillator whether the signal applied to the secondary winding of transformer 15 be deviated or not. Indeed, this tuning effect is present even in the complete absence of such a signal, since the oscillator supplies its own quadrature control signal through the agency of the control tube and the quadrature circuit.

In order that the preferred class C mode of operation (or any other selected mode of operation) of tube 20 be maintained over long periods, in spite of circuit variations and tube aging, we prefer to employ an appreciable degree of direct current stabilization in the operation of the tube. This may be most conveniently provided by supplying screen potential to the screen grid 36 through a relatively high series resistance 37. In order to avoid the occurrence of degeneration at audio and radio frequencies, a relatively large by-pass condenser 38 may be connected between the screen grid 36 and cathode or ground. Alternatively, other methods of direct-current stabilization may be employed, such as a by-passed cathode resistor, in combination, if necessary, with positively biased grid return connections.

Although, in the circuit illustrated in Figure 2, the oscillator voltage and the phase detector signal are applied to grids 22 and 21, respectively, we desire it to be understood that substantially similar results may be obtained by reversing these connections.

Up to this point, the pop-eliminator 11 has been described only in general terms as a low-pass filter, the use of such a device being predicated upon the basic inventive concept which comprises—as hereinbefore discussed at length—supplying sufficient inertia to the frequency modulation detector to prevent it from following changes in frequency which occur at rates higher than the highest audio frequency.

It is in the results which flow from the proper design of this low-pass filter, and its cooperation with the particular type of synchronized oscillator hereinbefore described, that the present invention most conspicuously improves over the prior art. Generally speaking, frequency modulation detectors comprising synchronized oscillators in combination with phase detectors are well known in the art. Furthermore, attempts have been made, in the past, to insert low-pass filters between the output of the phase detector and the synchronizing means of the oscillator. See, for example, Fig. 1 of U. S. Patent No. 2,332,540, which patent is assigned to the assignee of the present invention. While the provision of these prior art filters might, at first blush, appear to be a step in the right direction, they were never effective in eliminating "pops" inasmuch as they were designed to attenuate only signals at I. F. frequency, which occasionally appeared in the output of the phase detector. With the aid of Figure 3 it will now be demonstrated that these prior art filters were utterly ineffective in eliminating the type of disturbance hereinbefore defined as a "pop." In Figure 3 there is shown a two dimensional system of orthogonal coordinate axes, respectively designated "Frequency" and "Attenuation," and intended to represent the extent to which a given filter, inserted between phase detector and synchronized oscillator, would attenuate phase detector output components of any given frequency. Since the range of frequencies to be covered in this analysis is very large, a logarithmic scale has been selected for the frequency axis. The diagram does not purport to represent the exact characteristics of specific filters, but is merely indicative of some general relations obtaining between frequency and attenuation; therefore no units have been indicated on the attenuation axis, the broken line labeled "cut-off" being merely indicative of the level of attenuation above which substantially no part of a signal of any given frequency is passed by a filter.

Figure 3:
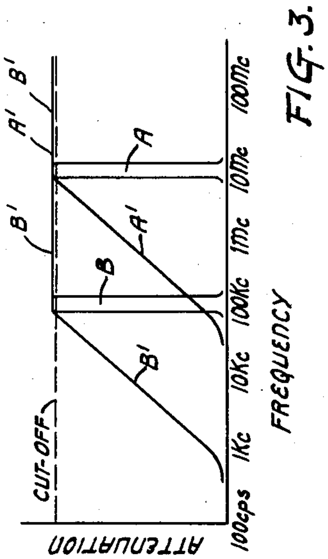
Figure 3 is a diagram which will be useful in explaining the performance of the embodiment shown in Figure 2.

Curve A of Figure 3 defines the range of frequencies which the prior art filter desired primarily to eliminate and shows the characteristics of an ideal filter for this range. The center of this frequency range is at the undeviated I. F. frequency, which may, in conventional wide-band FM systems, be approximately ten megacycles. There the attenuation is beyond cut-off and this condition extends over a range of perhaps one megacycle on either side of the center frequency. It has been previously shown, specifically in connection with the discussion of Figure 1, that in a conventional wide-band FM system, the signal which caused the appearance of a "pop" was located in a frequency range in the vicinity of 150 kilocycles. Curve B indicates the ideal characteristic of a filter which would perform the function of removing "pops" by attenuating the objectionable frequencies in a narrow range centered about 150 kilocycles. A filter having a characteristic such as that shown by curve A would, of course, be totally ineffective in attenuating frequencies within the range of curve B, and would, therefore, do nothing to prevent the appearance of "pop." Since the true nature and origin of the noise signals which cause "pops" were unkown heretofore, there was, in fact, no reason why prior art filters should possess attenuation characteristics which extend beyond the limits of curve A.

As has been pointed out, hereinbefore, the filter characteristics represented by curves A and B, respectively, are those of ideal filters, it being, in general, impractical to design and construct filters which have such sharp cut-off characteristics. A more realistic representation of the characteristics of a prior art filter is given by curve A' which shows the variation with frequency of the attenuation of a practical low-pass filter which reaches its cut-off frequency in the vicinity of the I. F. band. It may be seen that such a filter has more or less continuously decreasing attenuation over a wide range of frequencies below the minimum value of the ideal range. A similar line of reasoning may be applied to the filter constructed in accordance with the present invention, which may, in practice have a characteristic such as represented by curve B' which shows that such a practical filter not only cuts off the desired band in the vicinity of 150 kilocycles, but also all the higher frequencies including those in the I. F. band. In addition, curve B' shows that the high, but audible, audio frequencies present in the output of the phase detector also suffer considerable attenuation. This latter observation is worthy of considerable emphasis, since such attenuation of the high audio frequency components of the detector output could obviously not be tolerated in prior art systems where the audio output of the system was obtained directly from the output of the phase detector. This consideration further supports the conclusion that prior art filters were not effective in eliminating the source of "pop" noise since these filters could not be built with sufficiently low cut-off characteristics for this purpose without considerably impairing the audio output of the system. Summarizing, it may be said that the prior art filters interposed between the phase detector output and the synchronized oscillator were not designed to attenuate the frequency components responsible for the occurrence of "pops," firstly, because the nature of these components was unknown and, secondly, because such filters would have impaired the audio output of the detector by heavily attenuating the high audio frequencies.

A system such as that of Figure 2, which is constructed in accordance with the present invention, does include a filter which is effective in cutting off components of those frequencies which are responsible for "pops," but the audio output remains unimpaired since the audio signals are taken from the output of the synchronized oscillator which is entirely independent of amplitude variations in the phase detector output provided only that the output is of sufficient amplitude to maintain the oscillator in synchronism. Thus it is the cooperation of the filter constructed in accordance with the present invention with the oscillator whose audio output is substantially independent of synchronizing signal amplitude which produces the unique result of eliminating "pops" without distorting the audio output. It is possible, without any undue difficulty, to adjust the frequency characteristic of a filter constructed in accordance with the present invention so that it fulfills the condition of cutting off the undesired frequencies while passing the audio frequency output with sufficient amplitude to synchronize the oscillator. Such adjustment will, of course, depend upon the signal amplitude needed to synchronize the oscillator at the highest frequency which it is desired to detect and will be made in accordance with conventional principles of filter design, too well known to require further comment here. In accordance with the same principles, the filter constructed in accordance with the present invention will, preferably, also cut off all frequencies higher than those responsible for "pops," thereby preventing harmonics of those, as well as signals at IF frequency from affecting the operation of the receiver.

It is known, in addition, that the presence of a filter introduces not only attenuation, but also phase shift, into a network and investigation has shown that, if the phase shift due to the low-pass filter of which pop-eliminator 11 is comprised, is permitted to exceed ninety degrees, the circuit may break into oscillation.

A preferred embodiment of our invention, therefore, comprises a pop-eliminating filter so designed as to cause less than a ninety degree phase shift for frequencies within the passband of the filter. Typical values for the circuit elements of the filter which have been found to give satisfactory results in practice are 20,000 ohms for each of the resistors designated by reference numeral 17, 4000 ohms for each of those resistors designated by reference numeral 19, and 500 micro-microfarads for each of condensers 18. It will be understood that the value of the various elements are by no means limited to those specifically listed, the latter being merely indicative of a preferred set of conditions. In fact, the basic characteristic of a filter constructed in accordance with the invention may be more generally defined in accordance with the preceding discussion from which it follows that it should be a low-pass filter which provides very high attenuation in the vicinity of a frequency $f$ such that $$f=1/t_c \text{ approximately}$$

where $t_c$ is the capture time of those circuits in which the ringing responsible for the occurrence of "pops" occurs. It will further be evident to anyone skilled in the art, that the low-pass filter composed of a passive network as shown in Figure 2, is not by any means, the only device which can successfully perform the function of pop-eliminator. Here again, the specific embodiment illustrated is only indicative of its preferred form, and any other means for accomplishing a similar result are consequently to be considered as within the purview of the present inventive concept.

While only one specific embodiment of our invention has been shown, it will be understood by anyone skilled in the art that many modifications thereof are possible within our inventive concept and we, therefore, desire this concept to be limited only by the scope of the appended claims.

We claim:

1. In a frequency-modulation receiver: a source of frequency modulated carrier signal; a carrier signal amplifier supplied with the signal derived from said source; a local oscillator having a frequency-determining tank circuit tuned substantially to the center frequency of said carrier signal; and means for synchronizing the signal produced by said oscillator with said carrier signal, said means comprising a phase detector supplied with said oscillator signal and with carrier signal from said amplifier and arranged to produce an output whose amplitude is indicative of the instantaneous phase difference between said supplied signals, a control tube having an anode circuit and first and second grid circuits, means applying said oscillator signal to one of said grid circuits, means coupling the anode circuit of said control tube to said oscillator tank circuit so as to apply the alternating signal in the anode circuit of said control tube to said oscillator tank circuit in quadrature relation with the oscillator signal across said tank circuit, and means including a filter applying said phase detector output to the other of said control tube grid circuits with such polarity as to decrease the said instantaneous phase difference, said filter being constructed and arranged to produce very high attenuation at a frequency equal to $1/t_c$, where $t_c$ is the capture time of said amplifier, and said filter being further constructed and arranged so as to transmit audio frequency signals with sufficient amplitude to effect synchronization of said oscillator.

2. In a frequency-modulation receiver: a source of frequency modulated carrier signals; a carrier signal amplifier supplied with the signal derived from said source; a local oscillator having a frequency determining tank circuit tuned substantially to the center frequency of said carrier signal; means for synchronizing the signal produced by said oscillator with said carrier signal, said means comprising a phase detector supplied with said oscillator signal and with carrier signal from said amplifier and arranged to produce an output whose amplitude is indicative of the instantaneous phase difference between said supplied signals, a control tube having an anode circuit and first and second grid circuits, means supplying said oscillator signal to one of said grid circuits, means coupling the anode circuit of said control tube to said oscillator tank circuit so as to apply the alternating signal in the anode circuit of said control tube to said oscillator tank circuit in quadrature relation with the oscillator signal across said tank circuit, and means including a filter applying said phase detector output to the other of said control tube grid circuits with such polarity as to decrease the said instantaneous phase difference, said filter being constructed and arranged to produce very high attenuation at a frequency equal to $1/t_c$, where $t_c$ is the capture time of said amplifier, and said filter being further constructed and arranged so as to transmit audio frequency signals with sufficient amplitude to effect synchronization of said oscillator; and an audio frequency load impedance connected in the anode circuit of said control tube for deriving a detected signal therefrom.

References Cited in the file of this patent

UNITED STATES PATENTS

| Number | Name | Date |
|---|---|---|
| 2,231,704 | Curtis | Feb. 11, 1941 |
| 2,332,540 | Travis | Oct. 26, 1943 |
| 2,462,759 | McCoy | Feb. 22, 1949 |
| 2,494,795 | Bradley | Jan. 17, 1950 |